US006971086B2

(12) United States Patent　　(10) Patent No.: US 6,971,086 B2
Reddy et al.　　(45) Date of Patent: Nov. 29, 2005

(54) COMMON USER INTERFACE DEVELOPMENT TOOLKIT FOR A SYSTEM ADMINISTRATION PROGRAM

(75) Inventors: Kirthiga Reddy, San Jose, CA (US); Wesley Scott Smith, Mountain View, CA (US); John Michael Relph, San Francisco, CA (US); Rebecca Underwood, Mountain View, CA (US); Jenny Leung, Los Altos, CA (US); James B. Orosz, Mountain View, CA (US); Roger Chickering, Granite Bay, CA (US); Christiaan Willem Beekhuis, San Jose, CA (US); Elizabeth Caroline Zeller, Sunnyvale, CA (US); Sandeep Jain, Menlo Park, CA (US); Delle Maxwell, Portola Valley, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 716 days.

(21) Appl. No.: 09/811,345

(22) Filed: Mar. 16, 2001

(65) Prior Publication Data

US 2002/0059559 A1　May 16, 2002

Related U.S. Application Data

(60) Provisional application No. 60/189,863, filed on Mar. 16, 2000.

(51) Int. Cl.[7] .................................................. G06F 9/44

(52) U.S. Cl. ..................................................... 717/109

(58) Field of Search ........................... 717/105; 707/10, 707/104.1, 102, 4, 201; 709/223, 250; 714/46; 345/502, 733, 700, 764, 810, 961

(56) References Cited

U.S. PATENT DOCUMENTS

| 5,430,836 | A | * | 7/1995 | Wolf et al. ................... 715/744 |
| 5,754,173 | A | * | 5/1998 | Hiura et al. .................. 715/744 |
| 6,112,015 | A | * | 8/2000 | Planas et al. ................. 709/223 |
| 6,353,446 | B1 | * | 3/2002 | Vaughn et al. ............... 345/733 |
| 6,381,644 | B2 | * | 4/2002 | Munguia et al. ............. 709/225 |
| 6,513,047 | B1 | * | 1/2003 | Talley ........................ 707/200 |

OTHER PUBLICATIONS

"Introduction to the Cluster Configuration Database", Rob Bradshaw, Revsion 15, Last Update Feb. 3, 1998, pp. 1–12, Feb. 3, 1998.*
"Cluster Administration Interface Model", Rob Bradshaw, Revision 4, Last Update Apr. 22, 1998, pp. 1–4.*
"Cluster Administration Services Basic Services", Rob Bradshaw, Revision 3, Last Update May 28, 1998, pp. 1–14.*
"Cluster Administration Services Messaging" , Rob Bradshaw, Revision 6, Last Update Jun. 8, 1998, pp. 1–22.*
"Cluster Administration Services Plugins", Rob Bradshaw, Plugin API, Version 1.0.0 Document Revision 3, Last Update: May 28, 1998, pp. 1–23.*
"Cluster Configuration Database: Back End Interface", Rob Bradshaw, version 1.0– revsion 20, Last Update Feb. 2, 1998, pp. 1–20.*
"Chaos Membership Services", Luca Andrea Castellano and Sharad Srivastava, Revision 1.1, Last revision Mar. 27, 1997, pp. 1–29.*
"Group Membership Services", A Bunch of Folks, Revision 0.970, Last revision May 15, 1998, pp. 1–36.*
"System Resource Manager Functional Specification, Architecture & Design", Michael Nishimoto, Paddy Sreenevasan, Manish Verma, revision 1.04, pp. 1–14, 1997.*
Putty 8045, An association in Rhino, pp. 1–376, Jan. 7, 1999.*
"Veritas Volume Manger Administrator's Reference Guide Release 3.0" Solaris P/N 100–000917, Jan. 1999, pp. 1–198.*
Veritas Volume Manger Command Line Interface Administrator's Guide Release 3.0 Solaris P/N 100–000916, Feb. 1999, pp. 1–148.*
"VERITAS Volume Manager—Getting Started Guide Release 3.0" Solaris Jan. 1999, P/N 100–000915, pp. 1–72.*
"RPM of Group User Interface/X", print out of RPM of Group User Interface/X, 36 pages and by Vendors 31 pages, total 67 pages, printed Apr. 15, 2004.*
"Network Associates Delivers Magic Total Services Desk— First 100 Percent Browser Support Application to Offer Drag–Drop Customization", PR Newswire, Mar. 29, 1999, 6 pages.*
Plethora of Enhancements Court OS–2 LAN Manager, Rob Garretson, PC Week, Apr. 12, 1988, 2 pages.*
The Aldridge Company's PreCursor software package evaluated, G.W. King, PC Magazine, Sep. 11, 1990, 3 pages.*
Support Desk in a Box, Informationweek, Jul. 19, 1999.*
RADLAN Demonstrates First Complete Integrated Routing Software Solution for Broadcom Strataswitch Family at Networld+Interop Week, Business Wire, Sep. 26, 2000, 3 pages.*
Workflow Template Process Template Development a WFT Workflow System, Template Software, Apr. 1997, copyright 1998, Chapters 1–2, 6 and 9.*

(Continued)

*Primary Examiner*—Todd Ingberg
(74) *Attorney, Agent, or Firm*—Schwegman, Lundberg, Woessner & Kluth, P.A.

(57) ABSTRACT

A toolkit for developing user-interfaces for a system administration program. The toolkit has a server-side application-programming interface (API). The server-side has task-registry files that each describe a task group. The toolkit also has a client-side API. A developer can customize product-specific properties files for a specific product and write code that calls the server-side and client-side APIs to create a graphical user interface for the specific product.

60 Claims, 16 Drawing Sheets

OTHER PUBLICATIONS

Workflow Template Process Template Using the WFT Development Environment, Template Software, Apr. 1997, copyright 1998, Chapters 1–2, 6.*

SNAP Foundation Template Using the SNAP Communication Component, Template Software, copyright date 1998, pp. 2–6.*

Generating USer Interface Code in a Model Based User Interface Development Environment, Paulo Pinheiro da Silva et al, ACM, 2000, pp. 155–160.*

* cited by examiner

Fig.12

```
┌─────────────────────────────────────────────────────────────┐
│ TASK FORM NAME   (STEP 2 OF 2)                              │
├─────────────────────────────────────────────────────────────┤
│   ┌───┐                                                     │
│   │▭  │    TASK NAME ~1405                                  │
│   │▬  │                                                     │
│   └───┘                                                     │
│                                                             │
│                               ┌──────────┐                  │
│      1410 ~ LABEL 2  :        │ FIELD 2  │                  │
│                               └──────────┘                  │
│                                                             │
│                              •                              │
│                              •                              │
│                              •                              │
│                                                             │
│                                                             │
│                          1430                               │
│  ┌──────────┐         ┌────────┐    ┌────────┐  ┌────────┐  │
│  │ PREVIOUS │         │   OK   │    │ CANCEL │  │  HELP  │  │
│  └──────────┘         └────────┘    └────────┘  └────────┘  │
└─────────────────────────────────────────────────────────────┘
```

Fig. 14

COMMON USER INTERFACE DEVELOPMENT TOOLKIT FOR A SYSTEM ADMINISTRATION PROGRAM

CROSS-REFERENCE TO RELATED APPLICATIONS

This application is related to and claims the priority of a U.S. Provisional Patent Application entitled "HIGH-AVAILABILITY APPLICATION PROGRAMMING INTERFACE AND METHOD," Ser. No. 60/189,863, filed Mar. 16, 2000, and incorporated herein by reference.

FIELD OF THE INVENTION

This invention relates generally to computer systems, and more particularly to development of user interfaces for a computer system administration program.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © Silicon Graphics Incorporated, 2000. All Rights Reserved.

BACKGROUND OF THE INVENTION

Interfaces for various system administration applications can be inconsistent, requiring the user to learn each one of a variety of different system-administration applications. Typical system administration applications are hard to use and confusing for the non-technical user. The following are examples of the problems that users face:

Prerequisites and background knowledge. Users can get stuck when they must perform an administration task and do not know enough about the system to start or to complete the task. For example, users might want to share a file on the network, but do not know that in order to share an individual file, they must share the file's directory.

Information overload. Users can lose patience and feel overwhelmed when they must perform an administration task and are deluged with information from many sources: "Read this first!" documents packaged in the system box, release notes, books, and the Web. Their frustration is compounded when the information is only partly relevant or consistent.

Risk of system damage. Users can hesitate before performing an administration task that they perceive may damage the computer, whether or not there is real risk. Other users try ad hoc methods and unknowingly do system damage when trying to perform an administration task. For example, a user accustomed to a single-user system like a Macintosh might always log into the root account; to free up disk space, the user might remove large files that could be important to system operation.

Lack of confidence in result. Users who try to perform an administration task might not be certain that what they tried had the intended effect. For example, commands in prior systems that are issued at the command line sometimes return an invisible return code, and few state in plain English what has happened and what ramifications to expect.

Entry points difficult to find. Users and systems administrators can use different terminology when thinking about their systems, which makes it difficult for users to find and use the tools they need.

Error recovery. When something goes wrong, users can get stuck and not know how to fix the problem. For example, a user who unwittingly removes/Unix might continue to use the system for days or weeks until the system is rebooted, at which point it can be difficult to track down what went wrong, why, and how to fix it.

Deciding what to do next. Users might not know what to do next when they've run an unfamiliar command, whether the command seemed to have the desired effect or not. Users can become confused when there is no feedback informing them how far they've come in an administration task or what their options are at any given point.

Thus, there is a need for an infrastructure for building common, consistent, task-based user interfaces to applications that configure, manage, and monitor hardware and software.

SUMMARY OF THE INVENTION

The present invention provides solutions to the above-described shortcomings in conventional approaches, as well as other advantages apparent from the description and appendices below.

The present invention provides a toolkit for developing user-interfaces for a system administration program. The toolkit has a server-side application-programming interface (API). The server-side has task-registry files that each describe a task group. The toolkit also has a client-side API. A developer can customize product-specific properties files for a specific product and write code that calls the server-side and client-side APIs to create a graphical user interface for the specific product.

BRIEF DESCRIPTION OF THE DRAWINGS

FIG. 12 depicts a pictorial representation of an example user interface for a Form, according to an embodiment of the invention.

FIG. 14 depicts a pictorial representation of another example user interface for a Guide, according to an embodiment of the invention.

DETAILED DESCRIPTION OF THE INVENTION

In the following detailed description of exemplary embodiments of the invention, reference is made to the accompanying drawings, which form a part hereof, and in which are shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1:
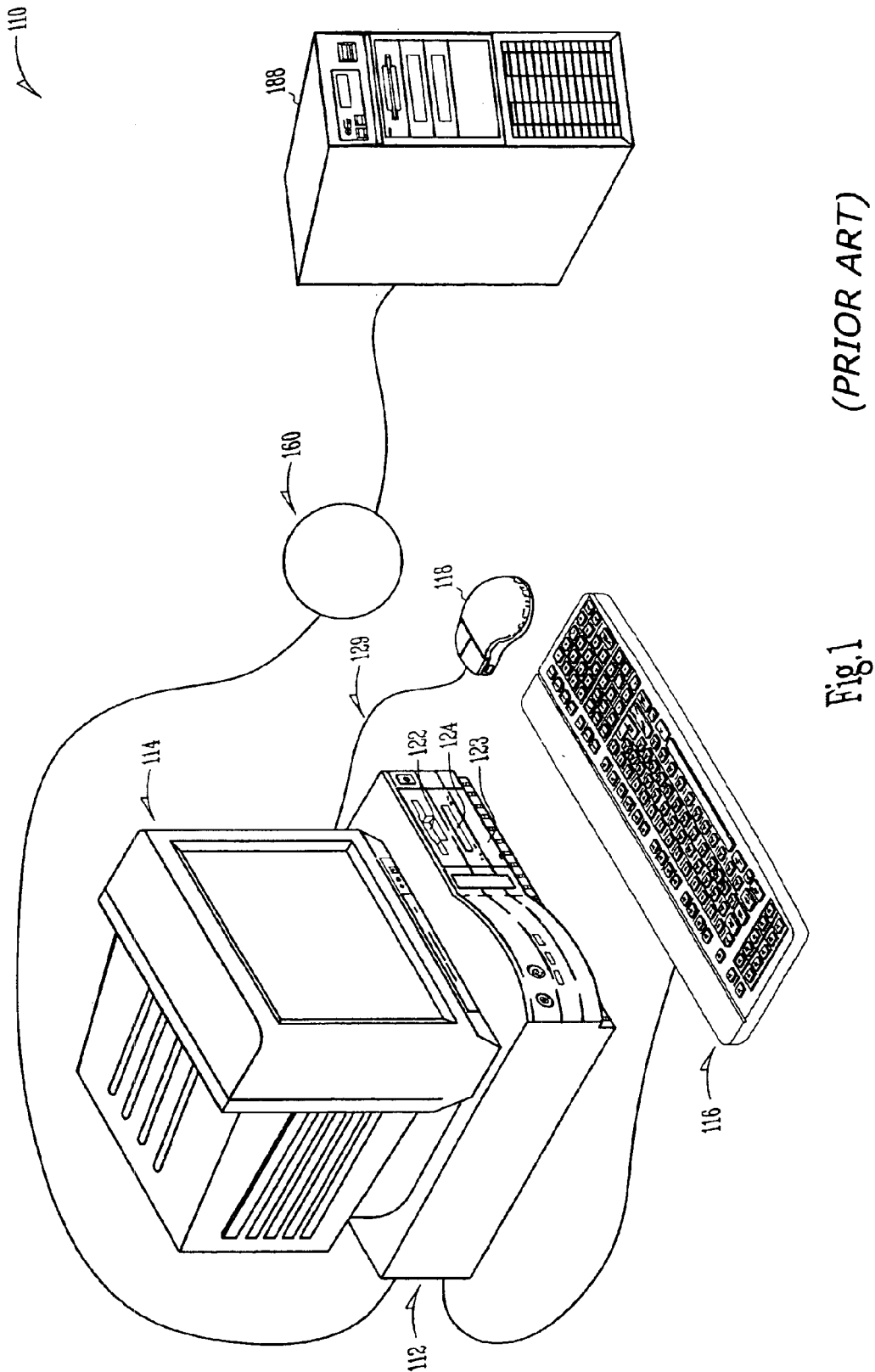
FIG. 1 depicts a pictorial example of a network of computer systems that can be used to implement an embodiment of the invention.

FIG. 1 depicts an example of a network of computer systems that can be used to implement an embodiment of the invention. Client computer system 110 is connected to remote server computer system 188 via network 160. Computer system 110 includes processing unit 112, display device 114, keyboard 116, pointing device 118. Processing unit 112 receives input data from input devices such as keyboard 116, pointing device 118, and network 160 and presents output data to a user via display device 114. Pointing device 118 is used in conjunction with a graphical user interface (GUI) in which hardware components and software objects are controlled through the selection and the manipulation of associated graphical objects displayed within display device 114. Although computer system 110 is illustrated with a mouse for pointing device 118, other graphical-pointing devices such as a graphic tablet, joystick, trackball, or track pad could also be used.

Keyboard 116 is that part of computer system 110 that resembles a typewriter keyboard and that enables a user to control particular aspects of the computer. Video-display terminal 114 is the visual output of computer system 110.

To support storage and retrieval of data, processing unit 112 further includes diskette drive 122, hard-disk drive 123, and tape drive 124, which are interconnected with other components of processing unit 112. Although diskette drive 122, hard-disk drive 123, and tape drive 124 are shown incorporated into system unit 112, they could be external to system unit 112, either connected directly, on a local area network (LAN), on network 160, or attached to remote computer system 188.

Computer system 110 can be implemented using any suitable computer available from a number of vendors. Computer system 110 is thus a configuration that includes all functional components of a computer and its associated hardware. In general, a typical computer system includes a console or processing unit such a processing unit 112, with one or more disk drives, a monitor such as video display terminal 114, and a keyboard such as keyboard 116. Remote computer system 188 can be implemented using any suitable computer that contains non-volatile storage. But, an embodiment of the present invention can apply to any hardware configuration that allows developing a user interface for a system administration program regardless of whether the computer system is a complete, multi-user computer apparatus, a single-user workstation, or a network appliance that does not have non-volatile storage of its own.

Figure 2:
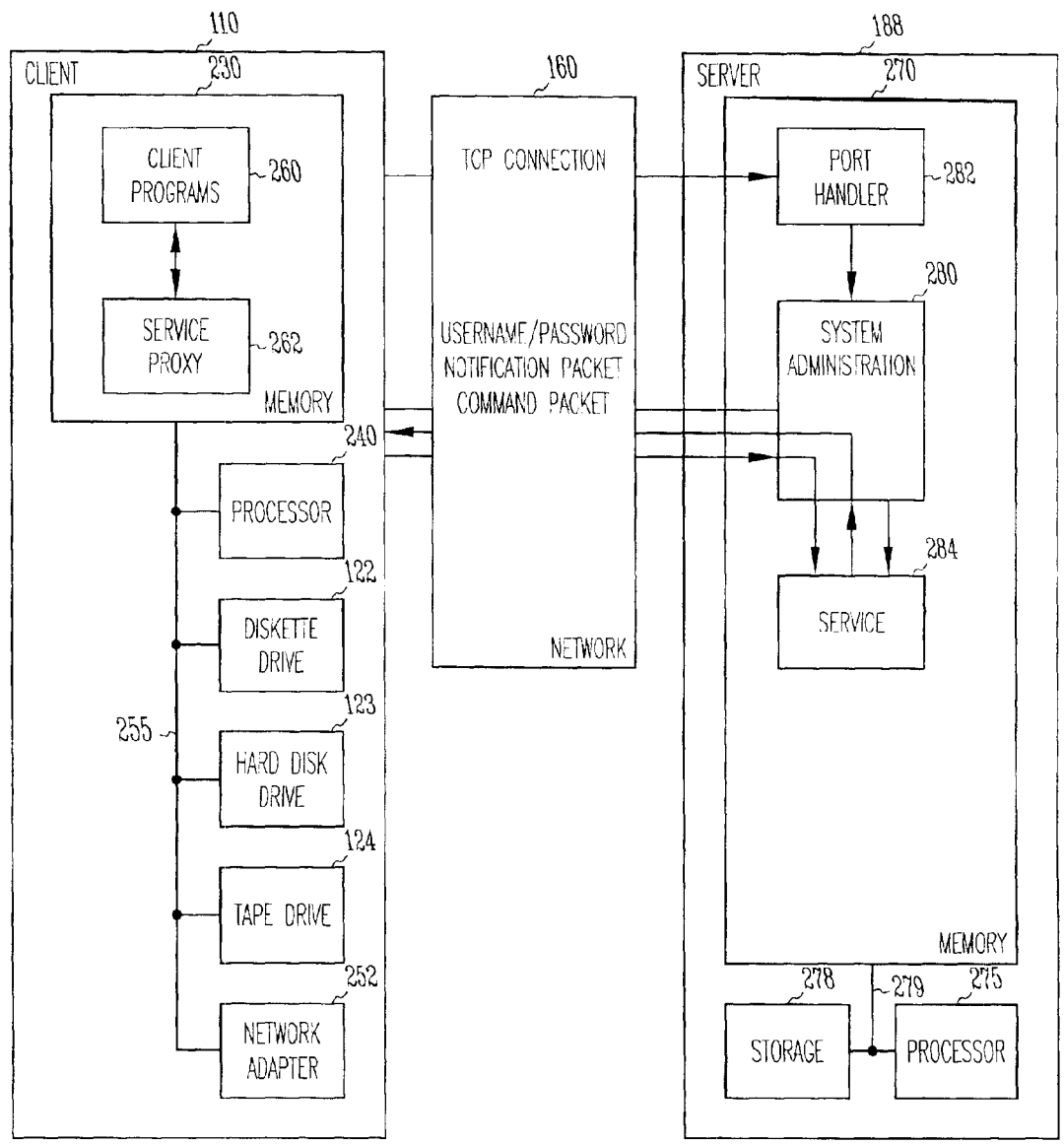
FIG. 2 depicts a block diagram of the principal components of a client and server attached via a network, according to an embodiment of the invention.

FIG. 2 depicts a block diagram of the principal components of processing unit 112 of client 110 and server 188 attached via network 160. Client 110 contains processor 240 connected via bus 255 to memory 230, diskette drive 122, hard-disk drive 123, tape drive 124, and network adapter 252. Although the various components of FIG. 2 are drawn as single entities, each may consist of multiple entities and may exist at multiple levels.

Processor 240 executes instructions and includes that portion of client 110 that controls the operation of the entire computer system, including executing the arithmetical and logical functions contained in a particular computer program. Although not depicted in FIG. 2, processor 240 typically includes a control unit that organizes data and program storage in a computer memory and transfers data and other information between the various part of the computer system. Processor 240 accesses data and instructions from and stores data to memory 230.

Any appropriate processor could be utilized for processor 240. Although client 110 is shown to contain only a single processor and a single system bus, the present invention applies equally to computer systems have multiple processors and to computer system that have multiple buses that each perform different functions in different ways.

Memory 230 comprises an number of individual, volatile-memory modules that store segments of operating system and application software while power is supplied to client 110. The software segments are partitioned into one or more virtual memory pages that each contain an uniform number of virtual memory addresses. When the execution of software requires more pages of virtual memory than can be stored within memory 230, pages that are not currently needed are swapped with the required pages, which are stored within non-volatile storage devices 122 or 123. Memory 230 is a type of memory designed such that the location of data stored in it is independent of the content. Also, any location in memory 230 can be accessed directly without having to start from the beginning.

Memory 230 contains client programs 260 and service proxy 262, which contain instructions capable of being executed by processor 240. In the alternative, they could be implemented by control circuitry though the use of logic gates programmable logic devices, or other hardware components in lieu of a processor-based system. The operation of client programs 260 and service proxy 262 are described below with reference to FIG. 3.

Diskette drive 122 and hard disk drive 123 are electro-mechanical devices that read from and write to magnetic disks, although any non-volatile storage devices could be used such as CD-ROM drives. Tape drive 124 is an electro-mechanical device that reads from and writes to tape media.

Finally, client 110 includes network adapter 252, which facilitates communication between client 110 and network 160, which might be a local area network (LAN), an intranet, or the Internet. Network 160 provides a user of client 110 with a means of electronically communicating information, including software, with a remote computer or a network logical-storage device. In addition, network 160 supports distributed processing, which enables client 110 to share a task with other computer systems linked to the network.

Network adapter 252 could also be a modem, which supports communication between client 110 and another computer system over a standard telephone line. Furthermore, through a modem, client 110 can access other sources such as server, an electronic bulletin board, and the Internet or World Wide Web.

Network 160 may include a plurality of networks, each of which could include a plurality of individual computers. Network 160 and server 188 could be located a great geographic distance from client 110, or they could be in the same room or even on the same desktop. Client 110 could be connected to network 160 via a standard telephone line, a dedicated cable, or a wireless communications link.

Server 188 contains memory 270, processor 275, and storage 278, which are all connected via system bus 279. Memory 270 can be any type of computer memory, analogous to those described for memory 230. Memory 270 contains system administration program 280, port handler 282, and service 284. Port handler 282 handles communication over network 160 to client 110 via a TCP (Transmission Control Protocol) connection, although any suitable communications protocol could be used.

System administration program 280 handles receiving packets from and passing packets to service 284. Packets are the basic unit of communication between client 110 and server 188. A packet, which contains a type that identifies which service 284 it is associated with and a selector that indicates which command or notification is being sent. Also, each packet contains key/value pairs of information that specify any additional information needed to convey the command or notification. Examples of packets are username/password packets, notification packets, and command packets. The username/password packet authenticates client 110 to the server 188. After authentication, communication between client 110 and server 188 takes the form of commands from client 110 to server 188 and notifications from server 188 to client 110.

In one embodiment, service 284 provides four services that client 110 can use to access server 188: category service, association service, task registry service, and privilege broker service, but any number and type of services could be provided. Client 110 uses the category service to retrieve information about server 188. The category service monitors an aspect of the system and maintains an Item for each entity. A Category represents a collection of monitored Item(s) of a specific type. For example, the collection of user account Item(s) can be represented by a Category instance.

An Item includes a list of key value pairs and represents some system entity to be administered, e.g., a cluster, a volume, or a file system. The client is notified when Items are added, changed, or removed. The association service maintains a state representing relationships between Items on the system. The Task registry services fetches lists of Tasks from the server based on criteria. The privilege broker service enables client 110 to run privileged commands on server 188. A privileged command is a command that is executed on server 188 with more privileges and permissions than the typical user. The functions of system administration program 280 and service 284 are further described below with reference to FIG. 4.

Processor 275 can be any type of computer processor, analogous to those described for processor 240. Storage 278 can be any type of non-volatile storage, analogous to those described for diskette drive 122, hard disk drive 123, and tape drive 124.

The configuration depicted in FIG. 1 is but one possible implementation of the components depicted in FIG. 2. Portable computers, Laptop computers, and network computers or Internet appliances are other possible configurations. The hardware depicted in FIG. 2 may vary for specific applications. For example, other peripheral devices such as optical-disk media, audio adapters, or chip programming devices, such as PAL or EPROM programming devices may be used in addition to or in place of the hardware already depicted. Thus, an embodiment of the invention can apply to any hardware configuration that allows developing user interfaces, regardless of whether the hardware configuration is a complicated, multi-user computing apparatus, a single-user workstation, or a network appliance that does not have non-volatile storage of its own.

As will be described in detail below, aspects of an embodiment pertain to specific method steps implementable on computers. In another embodiment, the invention can be implemented as a computer program product for use with a computer system. The programs defining the functions of the embodiment can be delivered to a computer via a variety of signal-bearing media, which include, but are not limited to (a) information permanently stored on non-writeable storage media (e.g., read only memory devices within a computer such as CD-ROM disks) readable by an unillustrated CD-ROM drive; (b) alterable information stored on writeable storage media (e.g., floppy disks within diskette drive 122, tape drive 124, or hard disk drive 123); or (c) information conveyed to a computer by a communications media, such as through a computer or telephone network including wireless communications. Such signal-bearing media, when carrying computer-readable instructions that direct the functions of the present invention, represent embodiments of the present invention.

Figure 3:
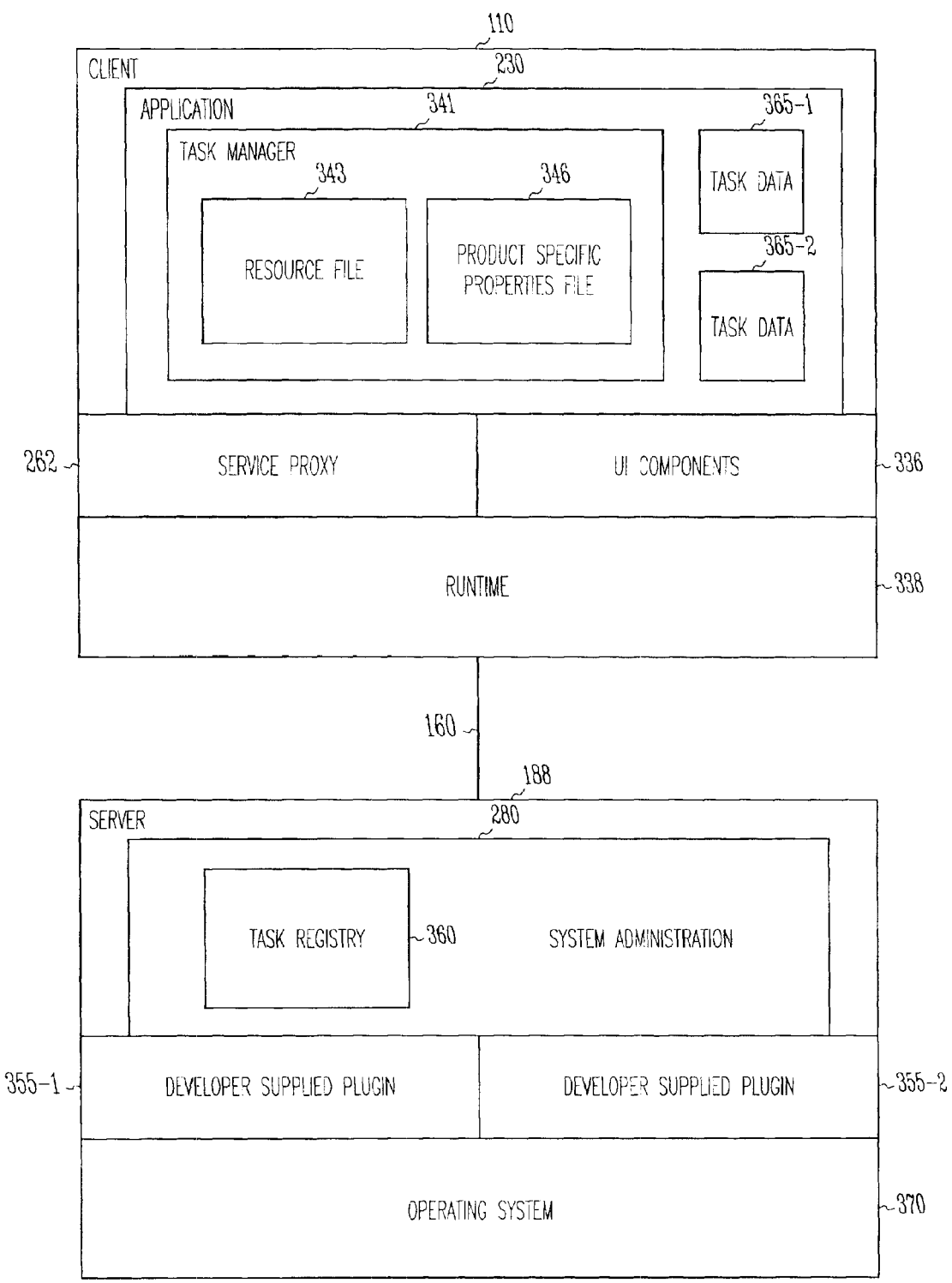
FIG. 3 depicts a block diagram showing more detail of the software architecture of an example client and server, according to an embodiment of the invention.

FIG. 3 depicts a block diagram showing more detail of the software architecture of client 110 and server 188, which are again connected via network 160. Client 110 contains application 230, service proxy 262, user interface components 336, and runtime 338. Application 230 contains Task manager 341. Task manager 341 contains resource file 343 and product-specific properties file 346. Although only one resource file 343 is shown, in another embodiment there are multiple resource files. Application 230 also contains Task data 365-1 and Task data 365-2. Although two task data files are shown, other embodiments any number can be present. Task data is further described below with reference to FIG. 4. The format of the properties file is further described below with reference to FIG. 7. Product-specific properties file 346 specifies which product's Task data must be loaded before the Task will run. Task manager 341 reads product-specific properties file 346 and creates Task-manager window 600, as further described below with reference to FIG. 6. Task manager 341 uses the functions of UI components 336 and runtime 338, which make up the client-side API (Application Program Interface).

The developer writes code (e.g., Java code) and customizes resource file 343 to create, for example, ItemView, CategoryView, TreeView, Task, and ResultView, which are all items that create a common user-interface. A developer writes code on server 188, such as developer-supplied plugins 355-1 and 355-2, to create Items and Categories. In one embodiment, there are separate resource files for each of these items. A CategoryView is a window displaying relevant information about a Category. A ResultView is further described below with reference to FIG. 15. An ItemView is further described below with reference to FIG. 16. A TreeView is further described below with reference to FIG. 17.

Server 188 contains system administration program 280, developer-supplied plug-ins 355-1 and 355-2, and operating system 370. System administration program 360 contains Task registry 360, which is further described below with reference to FIG. 8. System administration program 360 provides server-side API functions.

Figure 4:
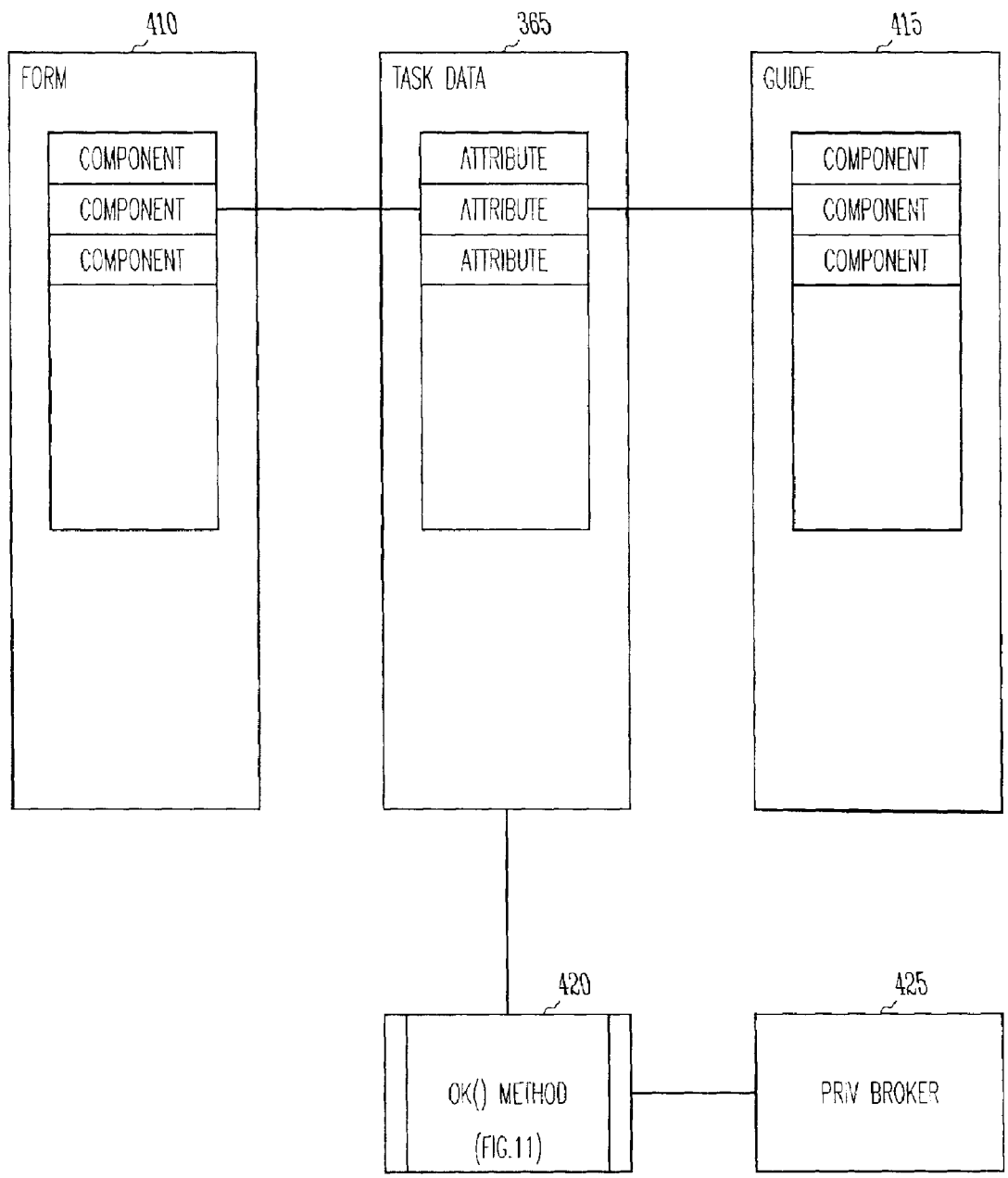
FIG. 4 depicts a block diagram of the relationships of tasks to task data, according to an embodiment of the invention.

FIG. 4 depicts the relationship of Tasks running on client 110 to Task data 365. A Task provides one or more user interfaces that prompt the user for parameters for making a change to the system, and OK method 420, which is called after the user has entered Form or Guide data, as further described below with reference to FIGS. 12, 13, and 14. In one embodiment, OK method 420 is an object-oriented method, which can be used to access or operate on encapsulated data within an object. OK method 420 is further described below with reference to FIG. 11. Referring again to FIG. 4, since a Task can have more than one user interface, e.g. Form 410 and Guide 415, and since the user can switch back and forth between user interfaces, the Task data mechanism is provided so that data is not lost when the user switches between interfaces. An example user interface associated with Form 410 is further described below with reference to FIG. 12. An example user interface associated with Guide 415 is further described below with reference to FIGS. 13 and 14. The Task's internal representation of what the user has entered is stored as attributes in Task data 365, so that when the component changes, Task data 365 changes, and when Task data 365 changes, the component is changed. Thus, all input is preserved when the user switches back and forth between Form 410 and Guide 415, and OK method 420 can obtain the parameters to pass to privilege broker service 425 from the common Task data rather than querying the user interface components.

Figure 5:
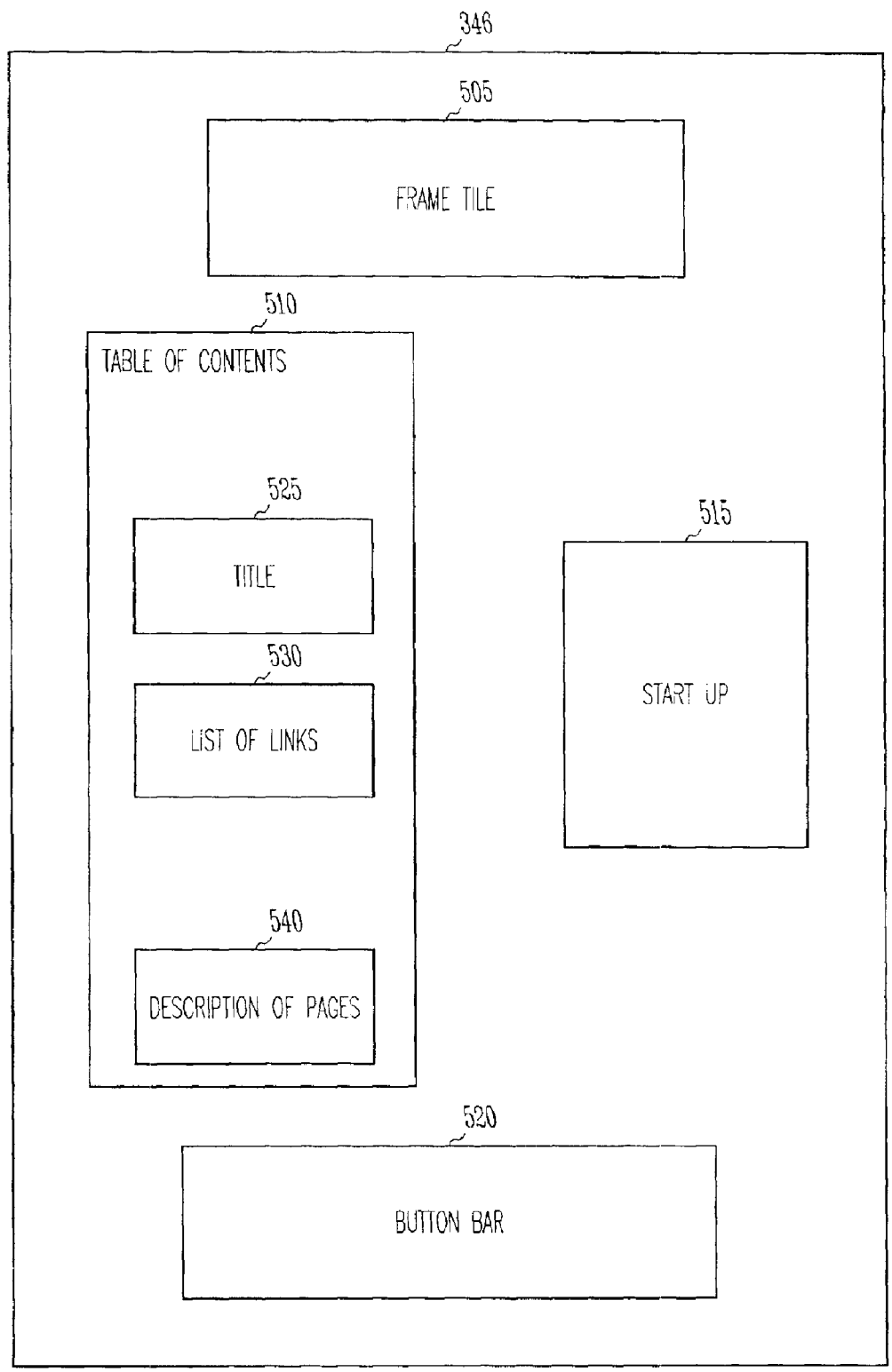
FIG. 5 depicts a block diagram of a product specific properties file, according to an embodiment of the invention.

FIG. 5 depicts a block diagram of product specific properties file 346, which Task manager 341 uses to create the Task manager user interface, as further described below in the description for FIG. 6. Referring again to FIG. 5, product specific properties file 346 contains title data 505, table of contents data 510, start up data 515, and button bar data 520. Title data 505 contains the title that the developer would like to see on the user interface. Table of contents data 510 contains title data 525, list of links data 530, and description of pages 540. Title data 525 contains the title that Task manager 341 will display in the table of contents section of the user interface. List of links data 530 contains the links that Task manager 341 displays in the table of contents section of the user interface. Description of pages 540 contains a list of the Tasks that Task manager 341 invokes when the user selects the associated link and may contain references to task groups.

Startup 515 contains pointers or other references to initialization code that runs when Task manager 341 starts up. For example, a product might want to set up default values for Task data 365 that will be used by product-specific Tasks.

Figure 6:
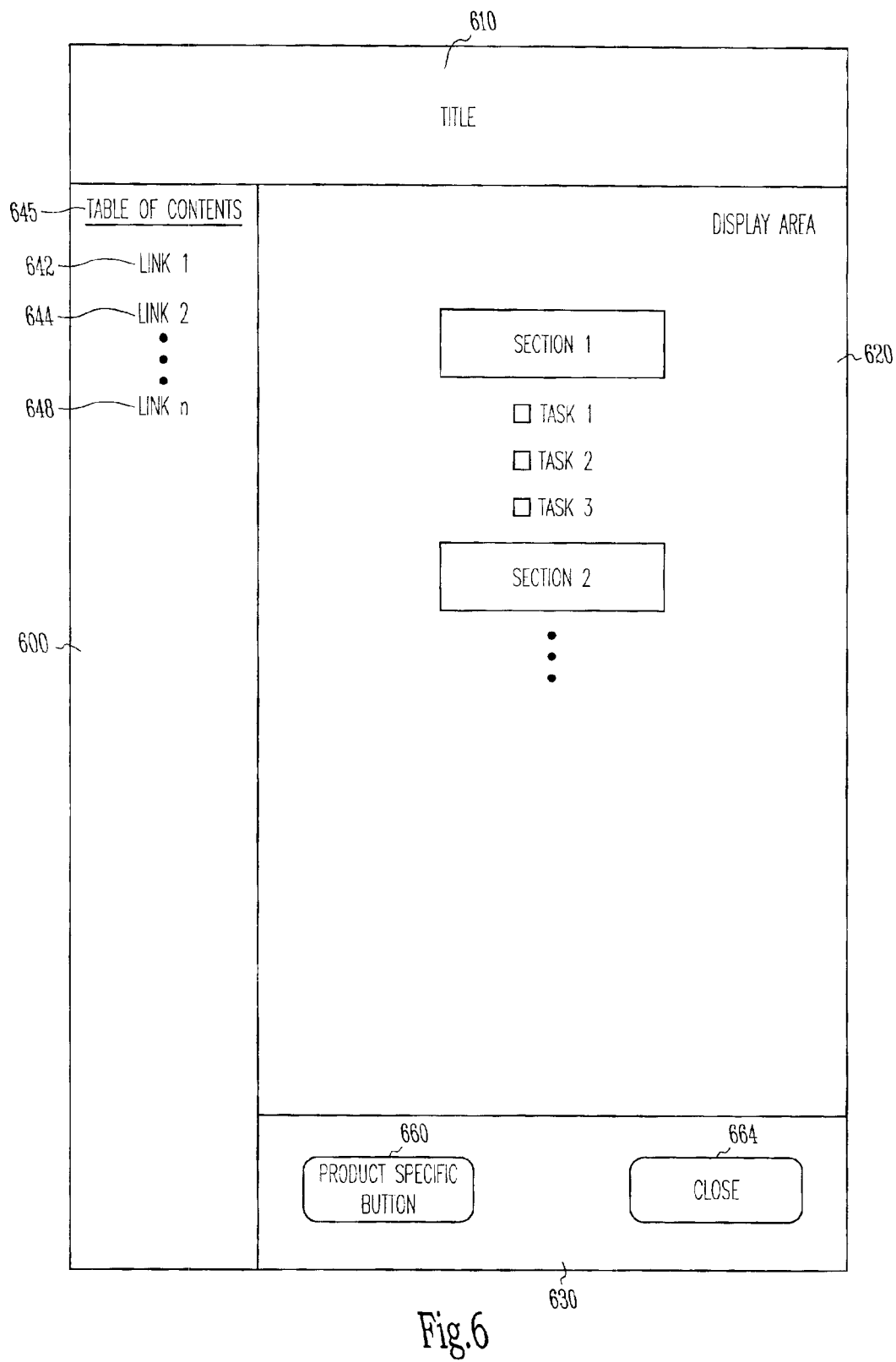
FIG. 6 depicts a pictorial representation of an example user interface, according to an embodiment of the invention.

Button bar data 520 contains button data that Task manager 341 uses to create buttons in the button bar section of the user interface, as further described in FIG. 6.

FIG. 6 depicts a pictorial representation of an example Task manager user interface. User interface 600 is shown. Task manager 341 builds user interface 600 using product specific properties file 346.

User interface 600 contains title area 610, table of contents area 615, display area 620, and button area 630. In one embodiment, an area is a frame or window that appears separately on display device 114.

Table of contents area 615 contains link1 642, link2 644, and linkn 648. When the user selects one of the links in table of contents area 615, for example link 642, client 110 consults description of pages 540. If description of pages 540 indicates that the page should show a task group, then client 110 sends a packet to server 188 indicating that a task group has been requested. In response, server 188 consults the corresponding task-registry file 360 and returns a list of tasks in the task group to client 110 for display in display area 620. An example of the displayed page is shown with Tasks 680-1, 680-2, and 680-3. When the user selects one of these Tasks, a Form or Guide window is displayed, as further described below with reference to FIGS. 12, 13, and 14.

Referring again to FIG. 6, button area 630 contains product specific button 660 and close button 664. When the user selects product specific button 660, actions specific to the product are performed. When the user selects close button 664, user interface 600 is closed.

Figure 7:
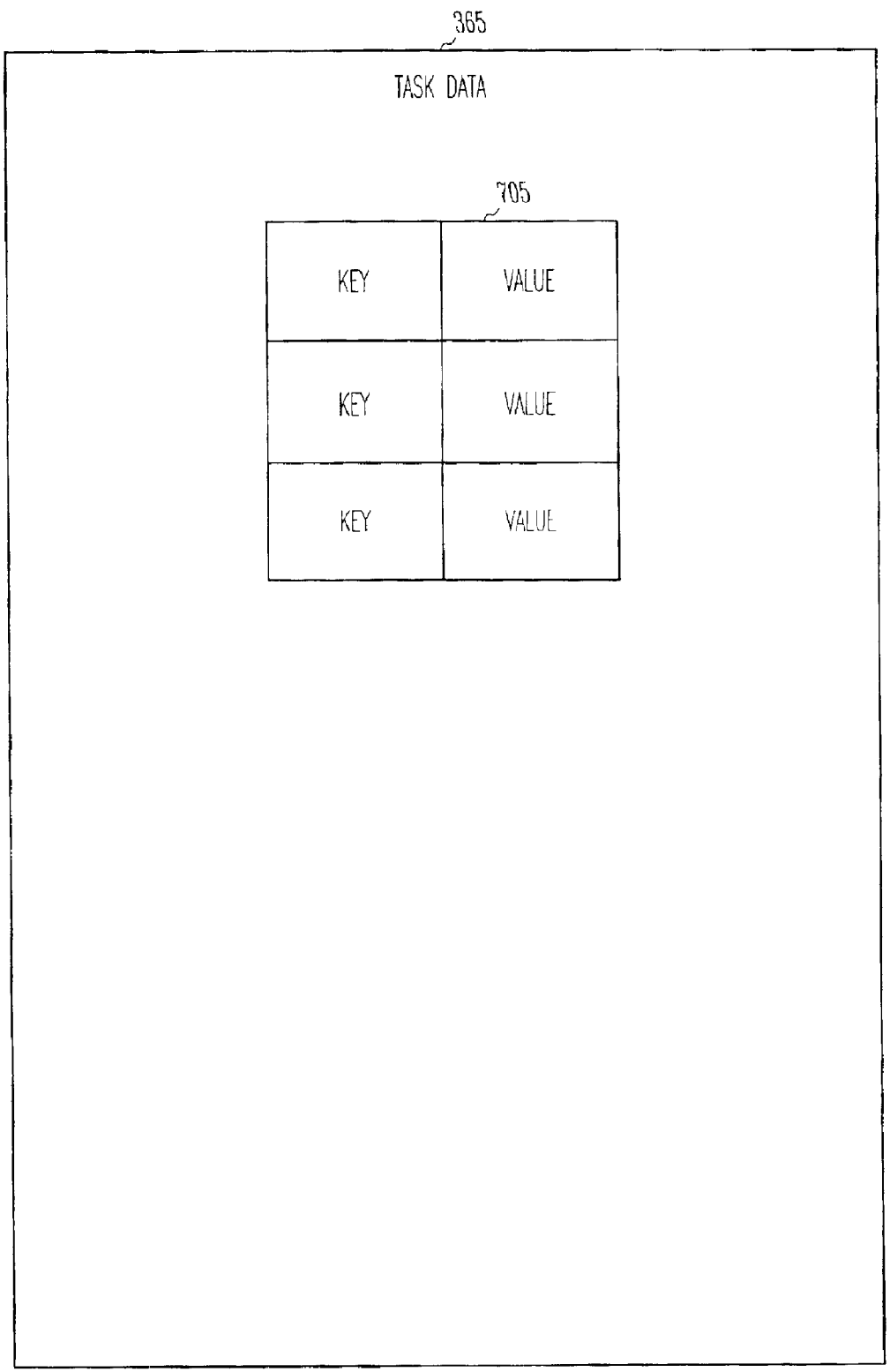
FIG. 7 depicts a block diagram of the format of a task data file, according to an embodiment of the invention.

FIG. 7 depicts a block diagram of the Task data structure. Task data 365 contains a set of key/value pairs 705 representing the information entered by the user as well as other Task states. These key/value pairs are associated with a particular login session. Task data 365 can be used to share information among different input components within a Task, as well as among different Tasks in a session.

Figure 8:
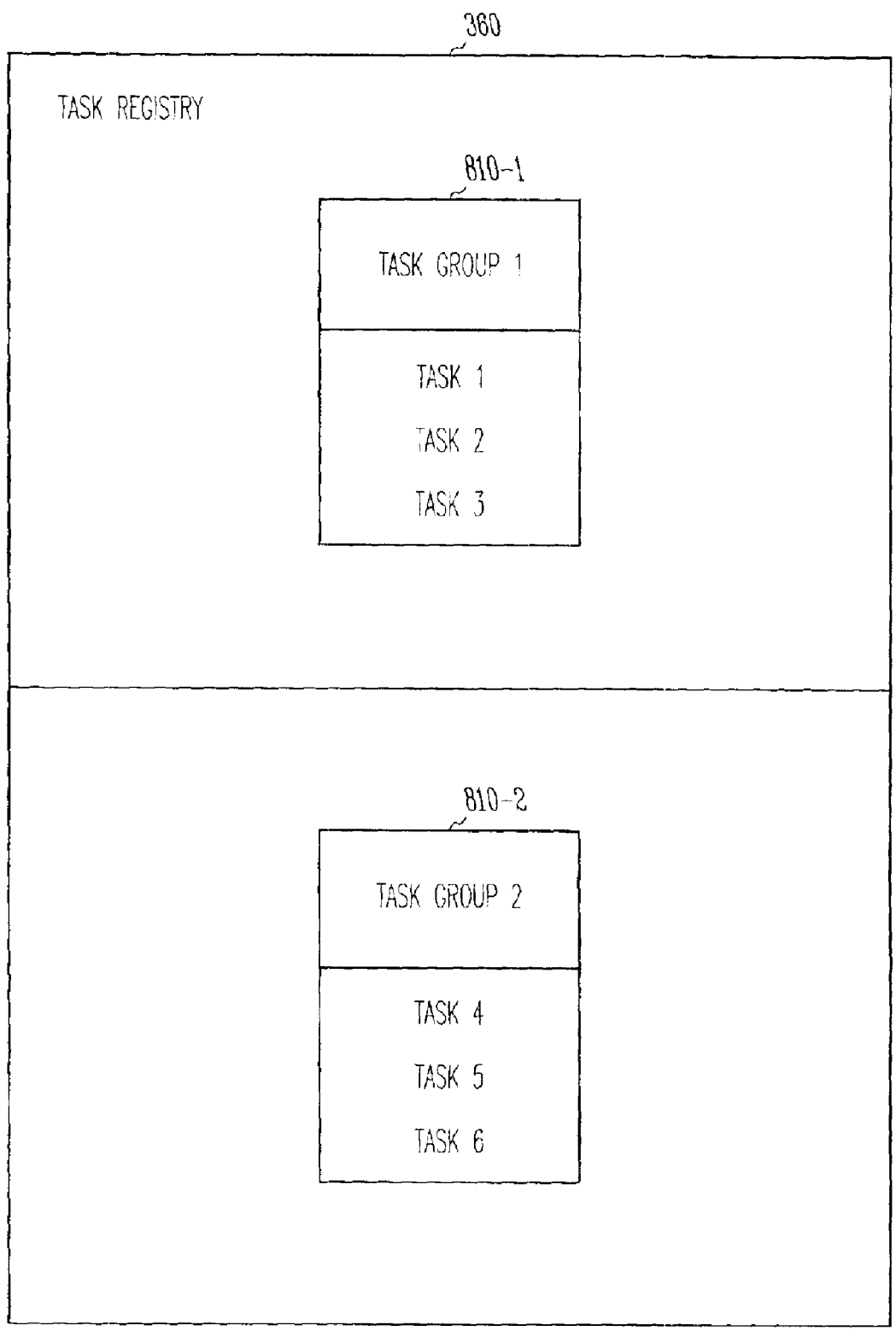
FIG. 8 depicts a block diagram of the format of a task registry file, according to an embodiment of the invention.

FIG. 8 depicts a block diagram of the Task-registry data structure 360, which maps task groups to Tasks. Task-registry data structure includes tables of task groups and task names 810-1 and 810-2. Although two tables are shown, in other embodiments, any number can be present.

Figure 9:
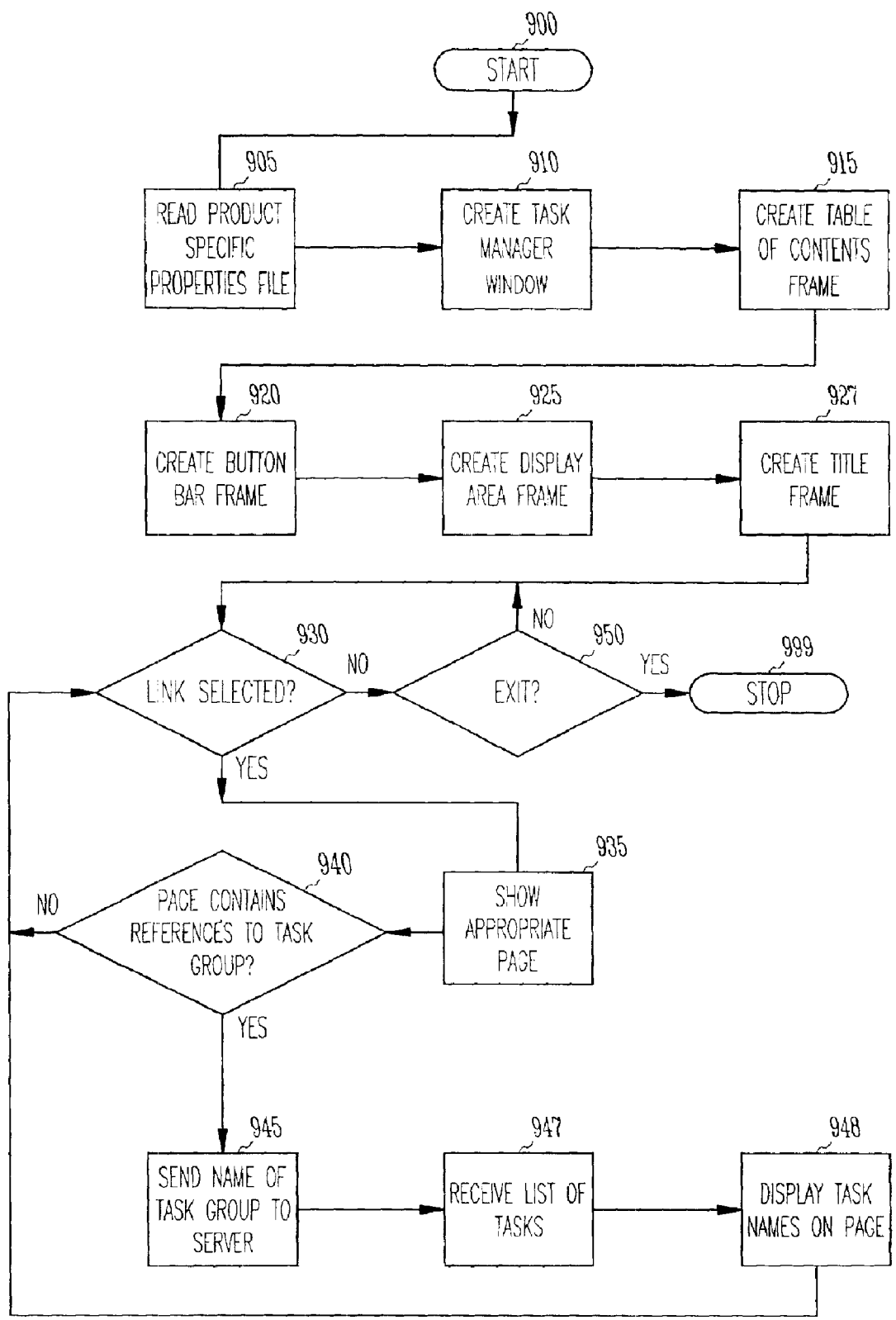
FIG. 9 depicts a flowchart of the operations of the client, according to an embodiment of the invention.

FIG. 9 depicts a flowchart of functions performed by client 110 in response to the user starting Task manager 341. At block 900, control begins. Control then continues to block 905 where Task manager 341 reads the data in product-specific properties file 346. Control then continues to block 910 where Task manager 341 creates Task manager window 600. Control the continues to block 915 where Task manager 341 creates table of contents area 645 using table of contents data 510. Control then continues to block 920 where Task manager 341 creates button bar area 630 using button bar data 520. Control then continues to block 925 where Task manager 341 creates display area 620. Control then continues to block 927 where Task manager 341 creates title area 610 using title data 505. Control then continues to block 930 where Task manager 341 determines whether the user has selected one of the links 642, 644, or 648 in table of contents 645.

If the determination at block 930 is true, the control continues to block 935 where Task manager 341 displays the appropriate page for the link selected. Control then continues to block 940 where Task manager 341 determines whether the page contains references to a task group. If the determination at block 940 is false, then control returns to block 930, as previously described above. If the determination at block 940 is true, then control continues to block 945 where client 110 sends the name of the task group to server 188. Control then continues to block 947 where client 110 receives a list of tasks associated with the task group from server 188. Control then continues to block 948 where task manager 341 displays the task names on the page. Control then returns to block 930, as previously described above.

If the determination at block 930 is false, the control continues to block 950 where Task manager 341 determines whether the user has selected close button 664. If the determination is false, then control returns to block 930, as previously described above. If the determination at block 950 is true, then control continues to block 999 where Task manager 341 closes user interface window 600.

Figure 10:
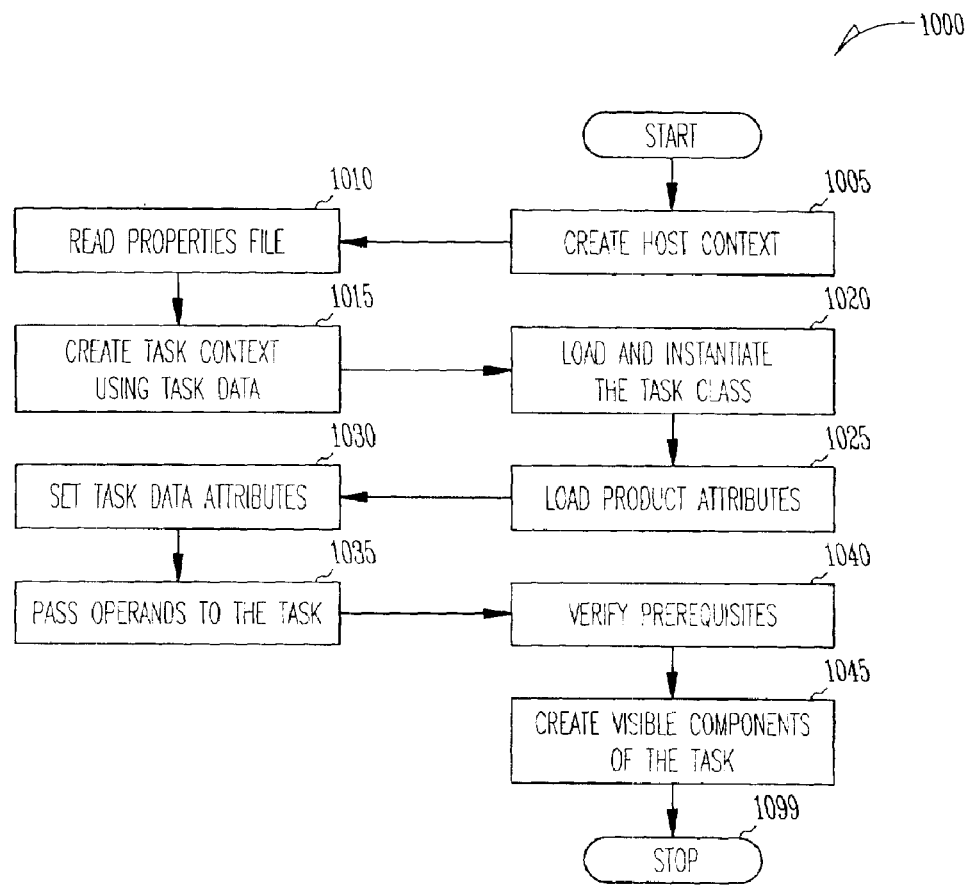
FIG. 10 depicts a flowchart of the operations of the server after the client has issued a login command, according to an embodiment of the invention.

FIG. 10 depicts a flowchart of the operations of system administration program 280 in server 188 in response to a user at client 110 initiating a login command. At block 1000, control begins. Control then continues to block 1005 where system administration program 280 creates a host context. A host context is needed in order to access system administration services and shared data. The host context is created by the login process and typically persists until the last area (in one embodiment a frame) of the session has been closed. For example, when the user launches Task manager 341, the user will only have to log in once; any subsequent Task created will share the host context created at login time.

Control then continues to block 1010 where system administration program 280 reads Task data 365, which contains static information about the Task. Tasks are loaded in a two-step process to allow the Task to be queried for static information such as its user-readable name, icon image, and privileges needed to instantiate the Task. This is especially useful for Task clients that display information about a large number of Tasks, such as Task manager 341, but which don't want the overhead of loading any Task class into memory until it is launched.

Control then continues to block 1015 where system administration program 280 creates the Task context using Task data 365. The Task context is used by Task subclasses and their components to share data and state information during the life of the Task. An example of data would be information entered by the user, while state could include information about the server connection.

Control then continues to block 1020 where system administration program 280 loads the Task class into memory and instantiates the Task class.

Control then continues to block 1025 where system administration program 280 loads Task data 365 with product attributes 705. Product attributes 705 are stored in the host context, so that they can be shared by all components in a given session. When the product attributes are loaded for the first time, product-specific plugin 355 sets the attributes. Plugin 355 brings up a area that requests information from the user. Plugin 355 then copies the information to Task data 365. Subsequent requests to load product attributes 705 will not bring up a area, but will simply copy the attribute values cached in the host context into Task data 365 of the requestor's Task.

Control then continues to block 1030 where system administration program 280 overrides product attributes 705 if the client desires. Some Task clients may wish to override product attributes 705 or share Task data attributes among the Tasks. For example, a metaTask may wish to pass a Task data attribute from one Task to the next, so that the user doesn't have to enter the data twice. If Task data attributes are passed to the Task loader, it will attempt to copy those Task data attributes to the Task being loaded. Not all Task data attributes may be set by Task clients. Unless a Task has declared an attribute key public in its properties file, an attempt to retrieve attributes will cause the Task to exit with an assertion failure. This mechanism is in place to hide implementation details from Task clients.

Control then continues to block 1035 where system administration program 280 passes operands to the Task. Some Tasks may need an operand or operands on which to perform their operation. An operand is typically an Item selector, which is a string that uniquely identifies an administered object on the server. For example, the modify user account Task would take a single user account as an operand, while the delete user account Task might take on or more user accounts as operands, and the define user account Task would not take any operands. Operands are passed after product attributes are loaded and after Task data attributes are set to allow product attributes and Task data attributes to be overridden if desired. Because operands may be passed to Tasks by a class with no specific knowledge about the Task, no ordering of operands is required by the Task.

Control then continues to block 1040 where system administration program 280 verifies that all the prerequisites are in place to run the Task. This includes checking the Task data attributes, operands, privileges, and state of the system being administrated. The principle behind verifying prerequisites is to detect error conditions as early as possible. For example, a Task that requires special system software to be installed should check the system for that software at this stage of Task loading. It is annoying for users to enter data and then discover that the system is not in a state to perform the Task. The Task loader calls three different verification methods. This three-stage process is aimed at providing error feedback to the user as early as possible.

(1) The first stage is where most verification occurs. Only checks that require privileges, such as accessing read-protected files, are deferred to the third stage.

(2) The second stage checks the privileges that are defined in the properties file of the Task. If the user does not have the required privileges, the user is asked to enter the root password to continue.

(3) The final verification stage is provided for those rare Tasks that need privileges to fully verify that the Task is ready to run. For example, Tasks that require access to read-protected files will need to have privileges before being able to verify that the Task prerequisites are met.

Control then continues to block 1045 where system administration program 280 creates the visible components of the Task. The visible components of a Task are created after the Task has been added to a visible area (a frame in one embodiment) or its frame parent becomes visible for the first time. Then, visible components are created on a just-in-time basis. Tasks are displayed within an existing area. Control then continues to block 1099 where the process stops.

Figure 11:
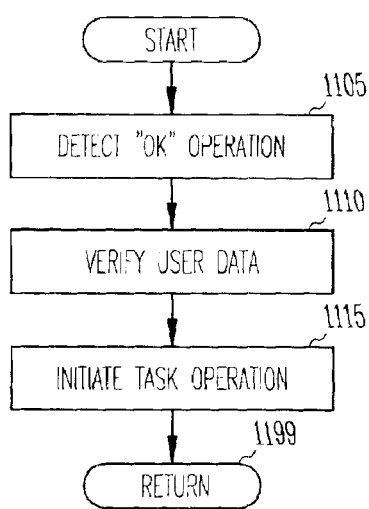
FIG. 11 depicts a flowchart of the operations of the server after the user has selected the "OK" button, according to an embodiment of the invention.

FIG. 11 depicts a flowchart of the server performing OK method 420. Control begins at block 1100. Control then continues to block 1105 where the Task determines that OK button 1230 or 1430 has been selected. Control then continues to block 1110 where the Task checks attributes 705 in Task data 365 to determine that they are valid and consistent. Control then continues to block 1115 where the Task operation is initiated. Control then continues to block 1199 where the function returns.

Figure 12:
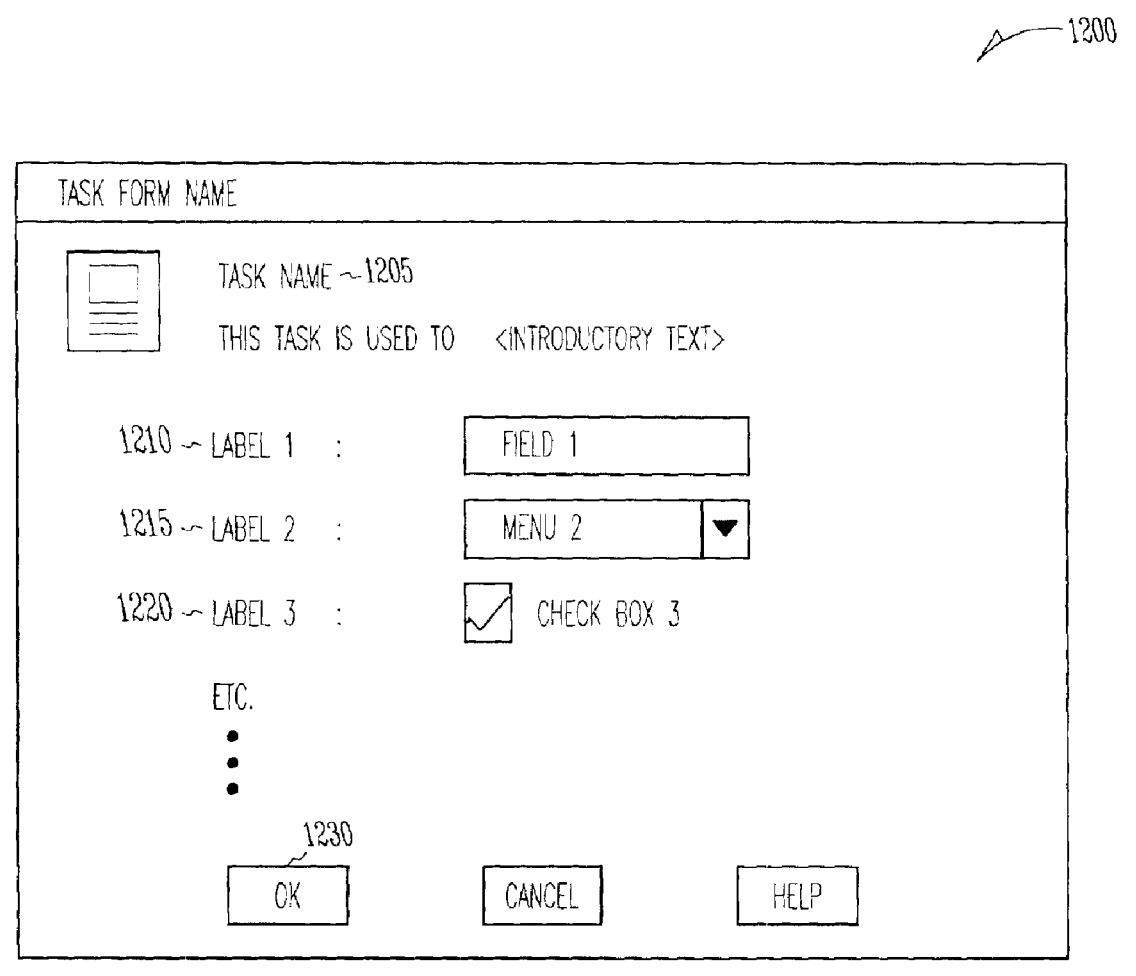

FIG. 12 depicts a pictorial representation of an example user interface for a Form. Task Form window 1200 is shown displayed on display device 114. Task Form window 1200 contains Task name 1205 and label fields 1210, 1215, and 1220. After the user has entered the appropriate data and selects OK button 1230, the operations previously described above with reference to FIG. 11 are performed. The purpose of the Form interface is to make the entry of Task parameters simple and fast. In one embodiment, it is suitable for Tasks of low complexity and a small number of parameters. Forms are the preferred interface when the typical users are knowledgeable and comfortable with the system being administered.

Figure 13:
FIG. 13 depicts a pictorial representation of an example user interface for a Guide, according to an embodiment of the invention.

FIG. 13 depicts a pictorial representation of an example user interface for a Guide. Task Guide window 1300 is shown displayed on display device 114. Task Guide window 1300 contains Task name 1305 and label field 1310. After the developer has entered the appropriate data and selects next button 1330, the user interface as described below with reference to FIG. 14 is displayed. A Guide is a multi-page GUI containing explanatory text with a small set of labeled input components on each page. The purpose of the Guide interface is to provide step-by-step guidance on completing a complex task or tasks with a large number of parameters. In one embodiment, Guides are the preferred interface when the typical users are novices or not comfortable with the system being administered.

FIG. 14 depicts a pictorial representation of another example user interface for a Guide. Task Form window 1400 is shown displayed on display device 114. Task Form window 1400 contains Task name 1405 and label field 1410. After the developer has entered the appropriate data and selects OK button 1430, the operations previously described above with reference to FIG. 11 are performed.

Figure 15:
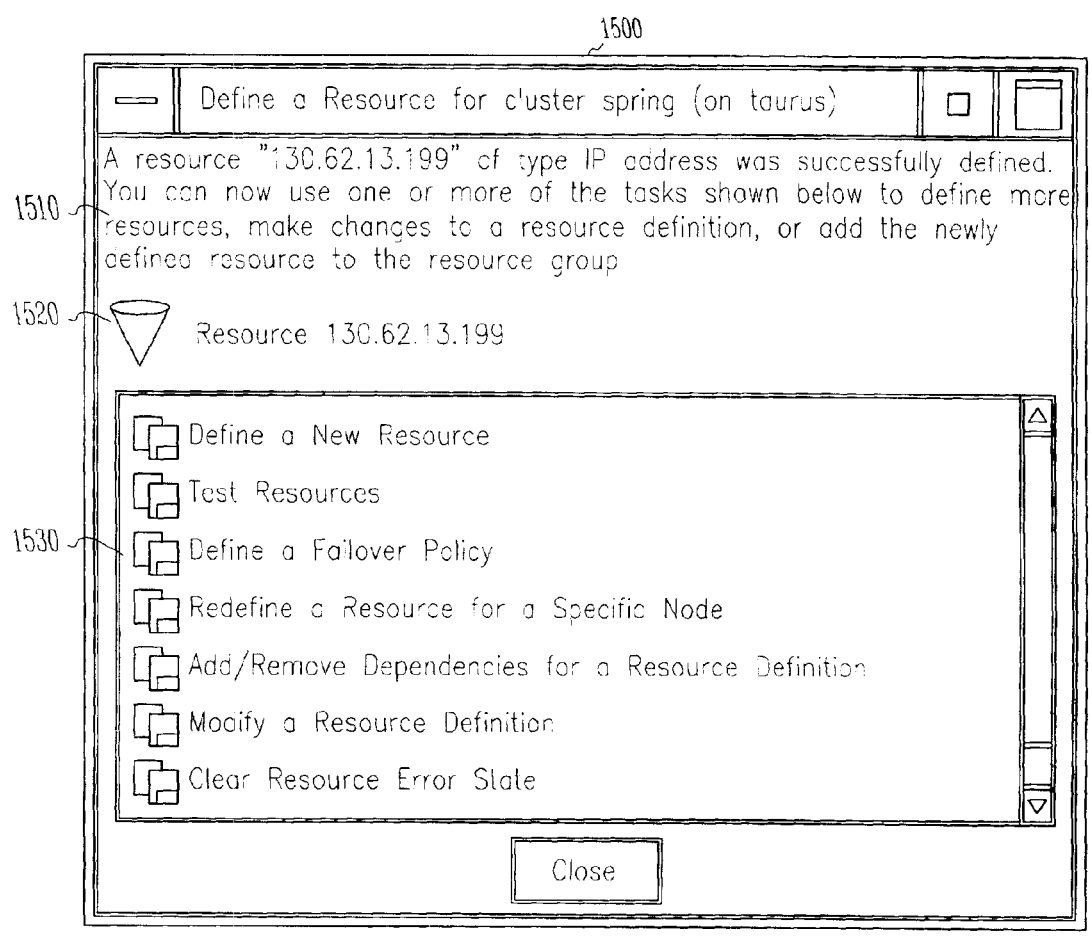
FIG. 15 depicts a pictorial representation of an example user interface for a ResultView, according to an embodiment of the invention.

FIG. 15 depicts a pictorial representation of ResultView window 1500, which displays the results of a Task that has been successfully completed. (If the Task could not be performed, the user is given an error message describing the problem, and the Form or Guide remains open until the Task is successfully completed or explicitly canceled.) ResultView window 1500 contains descriptive message 1510, icon 1520 representing the Item that was operated on (if applicable) and TaskShelf 1530 showing the related Tasks that the user may want to launch next. The user can launch the Tasks identified in TaskShelf 1530 by clicking on the task name or icon. In one embodiment TaskShelf 1530 is dynamic, meaning it will update the list of Tasks based on the state of the system.

Figure 16:
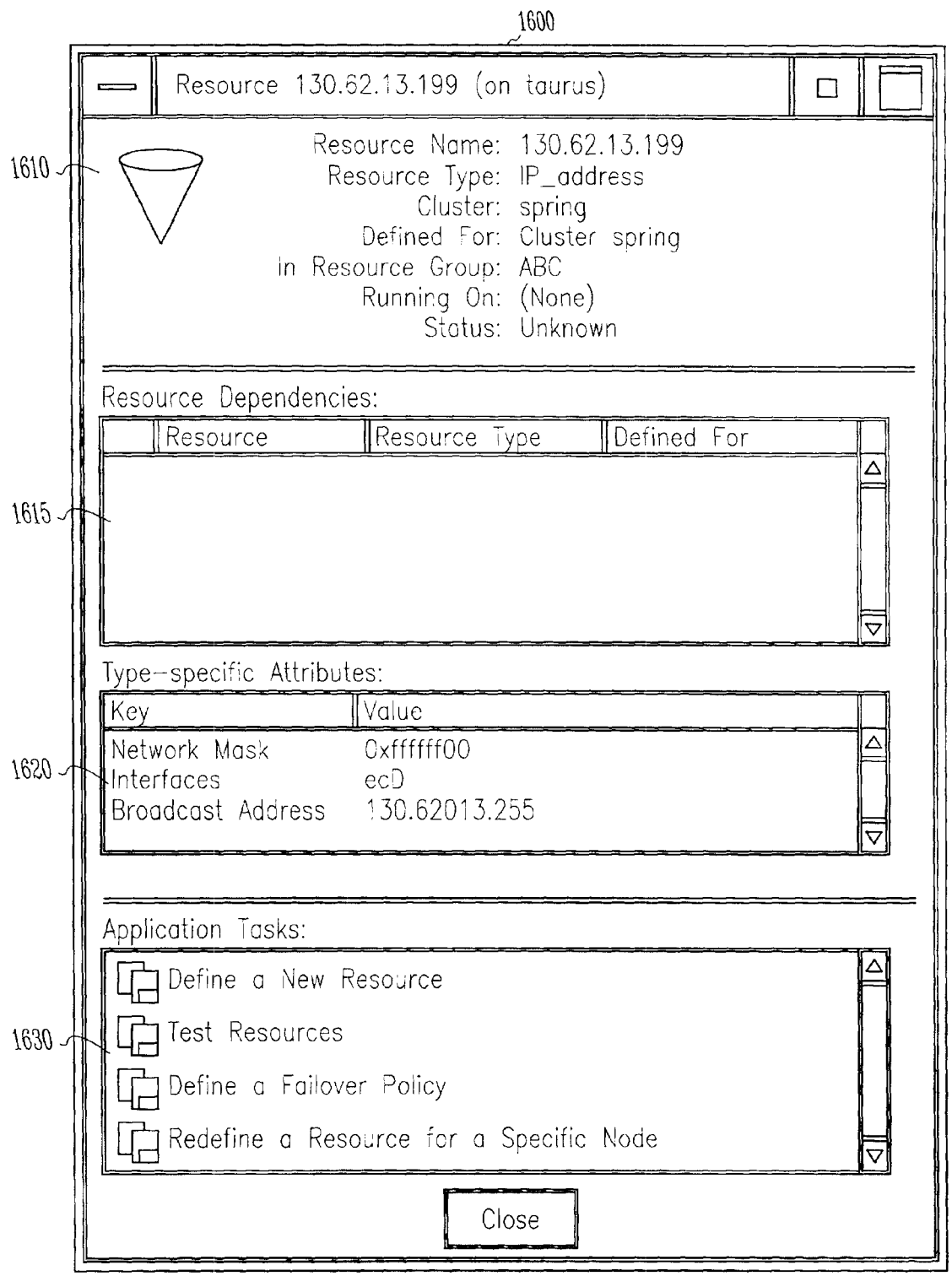
FIG. 16 depicts a pictorial representation of ItemView window, according to an embodiment of the invention.

FIG. 16 depicts a pictorial representation of ItemView window 1600, which displays relevant information regarding an Item. ItemView window 1600 displays the Item's icon 1610 with the icon color indicating the Item's state in one embodiment. ItemView window 1600 also displays application-specific contents in ItemTables 1615 and TaskShelf 1630. ItemTables 1615 shows information about all Items in a Category. ItemView window 1600 also displays Key-value pairs 1620.

Figure 17:
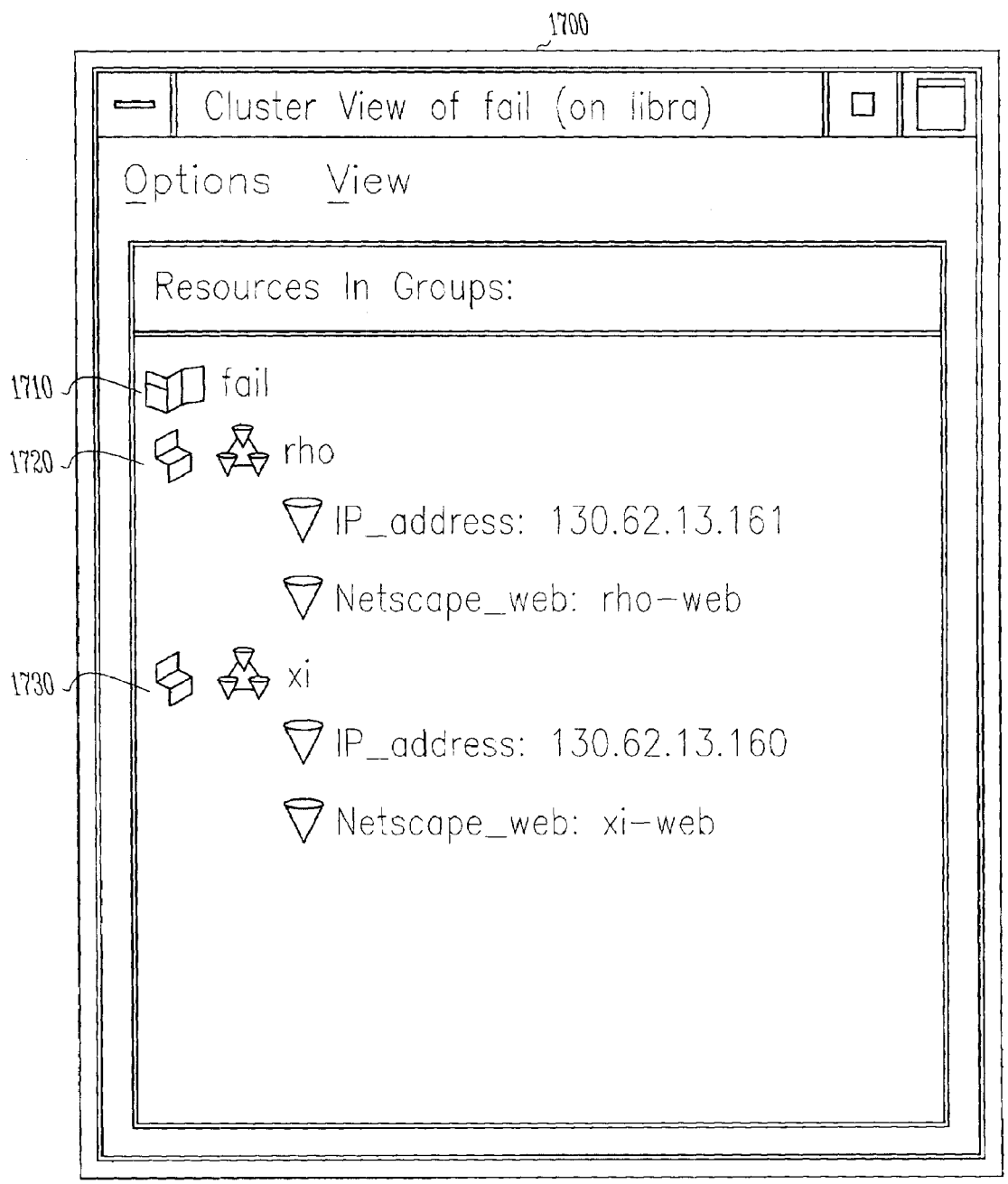
FIG. 17 depicts a pictorial representation of a TreeView window, according to an embodiment of the invention.

FIG. 17 depicts a pictorial representation of TreeView window 1700, according to an embodiment of the invention. TreeView window 1700 displays Items that have a hierarchical relationship. In example window 1700, three different kinds of Items are shown: the cluster "fall" 1710 contains tow resource groups rho 1720 and xi 1730, which each contain two resources.

Additional Features

1. Hand cursor appearing in tables

RichTextComponents in ItemTables can contain glossary links and task launchers, which look like web links. For the component to look just like a web link, the hand cursor appears and indicates to the user that a link is available and clickable. Other components in ComponentTables may be modified to have different cursors.

2. Blocking dialogs and blocking windows

The UIContext class allows correct blocking behavior and busy cursors over blocked windows, modal dialogs blocking a window or the whole application, and busy dialogs over a window or the whole application.

3. Many objects are cached, including Category Items, resources in ResourceStacks, Fonts, Colors, and other commonly used items.

4. Combination of sysadm GUI features.

Prerequisites are explicitly and complete. Unnecessary details are hidden by default. The truth is told about system status whenever possible. The user is told what will happen before and after a task. Problems are identified as soon as possible. Developers can write code to easily launch ItemViews, via the runItem View method of ItemView.

5. ItemView launch from ResultView

An ItemView can be easily launched from a Result View, which appears when a Task completes. The Result View displays the affected Item's name and icon, either of which can be clicked on to launch an ItemView. This icon and the name of the Item are updated if the Item changes and are always exactly the same as would be seen in the Item View. If the Task has created an Item, but the Item is not yet in the Category when the Result View appears, the Result View will print a message indicating that the Item is pending, and when the Item appears in the Category, the name and Icon will appear.

6. ItemTable, also called CategoryView.

A component is provided that displays all of the Items in a Category in table form, called an Item Table. The columns of the table are Attributes, and there is one Item per row. The first column of the table usually contains a small icon for the Item. The user can choose the column to sort by clicking on the column headers. Typically, there is not room in the table to display all of the Attributes on the Item, clicking on the name of the Item or Icon will launch an ItemView showing all the Attributes. The developer can choose which Attributes to display, the order in which they will be displayed, the width of the columns, the method of converting the Attribute to a string, and the height of the Table in the properties files. To allow for further customization, developers are allowed to write Java classes for each of the columns of the Table, and in that manner, any component can be displayed.

7. ItemFinder

Frequently, of the inputs to a Task is the name of an existing Item in a particular Category. For this type of input, an ItemFinder is supplied, which looks to the user like a JComboBox. The developer attaches the Item Finder to a Category or Association, and the ItemFinder code takes care of populating itself with the names of the Items. The developer can also pass an ItemTester Object, which can be used to filter the Items based on the contents of their Attributes. The ItemFinder will automatically keep itself up-to-date with the contents of the Category.

8. TaskData binder classes enable the developer to bind the state of the ItemFinder to the Task's TaskData. TaskData Binders connect the TaskData to the selected Item's user-visible name or the Item's sector. The developer can also programmatically read and change the selected Item, either by the user-visible name of the Item or by the Item's selector.

9. Icons

All of the icons displayed are rendered dynamically from vector-based icon description. This allows the developer to only create an icon once, but it can be displayed at any desired size. Once the icon description has been created, icons can be referenced by name in properties files so that developers can change any of the icons.

The icons for Items have some special properties. The icon's appearance can change based on the state of the Attributes of the Item. The color of the icon can change, an overlay can appear on top of the icon, the icon can be make to blink, or an entirely different icon can be used, all based on the Item's state, and all controlled by a simple properties file.

10. The developer can pre-generate source files that compile and run, displaying a basic GUI. This is a quick way for developer to get started. The source files are useful skeletons that the developer can examine as example code, as well as flesh out with their actual application functionality.

11. Different connection methods of security

The server daemon, sysadmd, can specify the authentication scheme to be used. Available schemes are Unix authentication and null. The default scheme is Unix, which requires a valid login/password pair before sysadmd will respond to further requests. The null authentication scheme does not require authentication of any kind and can be used when sysadmd is started from rshd. Since rshd implements its own authentication scheme, no further authentication is required on the part of sysadmd.

12. TreeView

The TreeView component displays a hierarchical view of Items in cascading Categories. Its is possible to provide a custom sort method to control the ordering of the display of the Items in any given category. Normally, Items in any given Category are sorted alphabetically by the Selectors of those Items.

13. LogViewer

The LogViewer component displays the contents of the /var/sysadm/salog file, but filters out, on the server for efficiency, less important messages.

14. Log file for all application changes

All applications automatically write their log messages to the /var/sysadm/salog file. End users can easily cut and paste form/to this log to record actions that they've taken in a GUI and that they want to be able to repeat as a script. Developers can watch this log while developing their application, to observe and correct their application's GUI behavior.

15. Consistent Help

The online end-user is provided help for all tasks that a user can accomplish using the GUI, and other related information. This help mechanism uses a platform-independent extensible help system that enables developers to incorporate online help in applications and applets. By clicking the Help button in a Task GUI, the user is able to view the detailed description of the task that the system is running. The help index window also allows a user to select a particular topic directly from the list. This feature is useful for new users or users who are not familiar with certain Tasks. The help system explains what the Tasks do.

16. Blinking icons

An object or Item can be represented by an icon that is displayed as part the GUI. This icon can be programmed to start or stop blinking to reflect the state of the object. This is an effective way to get the user's attention when immediate action is required for some situations.

17. Server-side Product attributes

Server-side product attributes are supported, so that the server can tell the client specific information about the product. This allows the client to detect differences in server software configurations, and thus the client can take special action if necessitated by the server configuration.

18. Splash Screen

The splash screen is an image that is displayed immediately after an application is executed and then is replaced by the application window once it is ready. This feature enables the developer to use an attractive image to give the user feedback that the GUI is starting up and to state the product's brand identity. An in-progress statement or any one-line informational text can be displayed at the bottom of the screen.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A toolkit on a computer readable medium and executing on a computer for developing user-interfaces for a system administration program, comprising:

a server-side application-programming interface (API), comprising a Task-registry file, wherein the Task-registry file comprises one or more Task groups; and a client-side API, comprising a product-specific properties file, wherein the product-specific properties file is customizable by a developer and the client-side API is callable by developer-supplied code to create a graphical user interface for a specific product.

2. The toolkit of claim 1 wherein the properties file comprises:

a title; and a product-specific list of page links.

3. The toolkit of claim 1, wherein the client-side API creates a Task-manager window comprising:

a customizable title.

4. The toolkit of claim 1, wherein the client-side API creates a Task-manager window comprising:

a customizable table of contents.

5. The toolkit of claim 1, wherein the client-side API creates a Task-manager window comprising:

a customizable display area.

6. The toolkit of claim 1, wherein the client-side API creates a Task-manager window comprising:

a customizable button bar.

7. The toolkit of claim 1, wherein the client-side API creates a Task-manager window comprising:

a display area.

8. The toolkit of claim 7, wherein the client-side API creates a Task-manager window comprising:

one of a text page, a Task-list page, and a class page.

9. The toolkit of claim 8, wherein the Task-list page comprises:

a list of Tasks that are related.

10. The toolkit of claim 9, wherein the Tasks are related by a type of object on which they operate.

11. The toolkit of claim 1, wherein the product-specific properties file comprises a ordered set of button tags, wherein each button has a name and a target class to be launched when the button is activated.

12. The toolkit of claim 1, further comprising a resource file, wherein the resource file is customizable by the developer.

13. The toolkit of claim 12, wherein the developer-supplied code uses the server-side API to create an Item, wherein the Item represents a system entity to be administered.

14. The toolkit of claim 12, wherein the client-side API and the resource file can be used by the developer-supplied code to create an ItemView.

15. The toolkit of claim 14, wherein the ItemView is launched from a ResultView.

16. The toolkit of claim 15, wherein the ResultView displays an affected Item's name.

17. The toolkit of claim 16, wherein the name is updated when the Item changes.

18. The toolkit of claim 12, wherein the server-side API can be used by the developer-supplied code to create a Category, wherein the Category represents a collection of monitored Items of a specific type.

19. The toolkit of claim 18, wherein the client-side API provides an Item Table, wherein the Item Table displays all Items in the Category in table form.

20. The toolkit of claim 12, wherein the client-side API and resource file can be used by the developer-supplied code to create a CategoryView.

21. The toolkit of claim 12, wherein the client-side API and resource file can be used by the developer-supplied code to create a TreeView.

22. The toolkit of claim 21, wherein the TreeView displays a hierarchical view of Items in cascading Categories.

23. The toolkit of claim 12, wherein the client-side API and resource file can be used by the developer-supplied code to create a Task.

24. The toolkit of claim 12, wherein the client-side API and resource file can be used by the developer-supplied code to create a ResultView.

25. The toolkit of claim 1, wherein the client-side API provides RichTextComponents that comprise glossary links and task launchers.

26. The toolkit of claim 1, wherein the client-side API provides blocking dialogs.

27. The toolkit of claim 1, wherein the client-side API provides an ItemFinder, wherein the ItemFinder populates itself with names of Items in a Category.

28. The toolkit of claim 1, wherein the client-side API renders icons dynamically from a vector-based icon description.

29. The toolkit of claim 1, wherein the client-side API provides icons that blink to reflect the state of an object.

30. The toolkit of claim 1, wherein the client-side API provides a splash screen, wherein the splash screen is displayed after an application is executed and before the application window is ready.

31. A tangible signal-bearing media for developing user-interfaces for a system administration program, wherein the signal-bearing media comprises instructions and data, which when read and executed by a computer comprise:
a server-side application-programming interface (API), comprising a Task-registry file, wherein the Task-registry file comprises one or more Task groups; and
a client-side API, comprising a product-specific properties file, wherein the product-specific properties file is customizable by a developer and the client-side API is callable by developer-supplied code to create a graphical user interface for a specific product.

32. The signal-bearing media of claim 31, wherein the properties file comprises
a title; and
a product-specific list of page links.

33. The signal-bearing media of claim 31, wherein the client-side API creates a Task-manager window comprising:
a customizable title.

34. The signal-bearing media of claim 31, wherein the client-side API creates a Task-manager window comprising:
a customizable table of contents.

35. The signal-bearing media of claim 31, wherein the client-side API creates a Task-manager window comprising:
a customizable display area.

36. The signal-bearing media of claim 31, wherein the client-side API creates a Task-manager window comprising:
a customizable button bar.

37. The signal-bearing media of claim 31, wherein the client-side API creates a Task-manager window comprising:
a display area.

38. The signal-bearing media of claim 37, wherein the display area comprises:
one of a text page, a Task-list page, and a class page.

39. The signal-bearing media of claim 38, wherein the Task-list page comprises:
a list of Tasks that are related.

40. The signal-bearing media of claim 39, wherein the Tasks are related by a type of object on which they operate.

41. The signal-bearing media of claim 31, wherein the product-specific properties file comprises a ordered set of button tags, wherein each button has a name and a target class to be launched when the button is activated.

42. The signal-bearing media of claim 31, further comprising a resource file, wherein the resource file is customizable by the developer.

43. The signal-bearing media of claim 42, wherein the client-side API and resource file can be used by the developer-supplied code to create an ItemView.

44. The signal-bearing media of claim 43, wherein the ItemView is launched from a ResultView.

45. The signal-bearing media of claim 44, wherein the ResultView displays an affected Item's name.

46. The signal-bearing media of claim 45, wherein the name is updated when the Item changes.

47. The signal-bearing media of claim 42, wherein the client-side API and resource file can he used by the developer-supplied code to create a CategoryView.

48. The signal-bearing media of claim 42, wherein the client-side API and resource file can be used by the developer-supplied code create a TreeView.

49. The signal-bearing media of claim 48, wherein the TreeView displays a hierarchical view of Items in cascading Categories.

50. The signal-bearing media of claim 42, wherein the client-side API and resource file can be used by the developer-supplied code to create a Task.

51. The signal-bearing media of claim 42, wherein the client-side API and resource file can be used by the developer-supplied code to create an ResultView.

52. The signal-bearing media of claim 31, wherein the server-side API can be used by the developer-supplied code to create an Item, wherein the Item represents a system entity to be administered.

53. The signal-bearing media of claim 31, wherein the server-side API can be used by the developer-supplied code to create a Category, wherein the Category represents a collection of monitored Items of a specific type.

54. The signal-bearing media of claim 53, wherein the client-side API provides an Item Table, wherein the Item Table displays all Items in the Category in table form.

55. The signal-bearing media of claim 31, wherein the client-side API provides RichTextComponents that comprise glossary links and task launchers.

56. The signal-bearing media of claim 31, wherein the client-side API provides blocking dialogs.

57. The signal-bearing media of claim 31, wherein the client-side API provides an ItemFinder, wherein the ItemFinder populates itself with names of Items in a Category.

58. The signal-bearing media of claim 31, wherein the client-side API renders icons dynamically from a vector-based icon description.

59. The signal-bearing media of claim 31, wherein the client-side API provides icons that blink to reflect the state of an object.

60. The signal-bearing media of claim 31, wherein the client-side API provides a splash screen, wherein the splash screen is displayed after an application is executed and before the application window is ready.

* * * * *

UNITED STATES PATENT AND TRADEMARK OFFICE
CERTIFICATE OF CORRECTION

PATENT NO. : 6,971,086 B2
DATED : November 29, 2005
INVENTOR(S) : Reddy et al.

It is certified that error appears in the above-identified patent and that said Letters Patent is hereby corrected as shown below:

Title page,
Item [56], References Cited, OTHER PUBLICATIONS,
"Network Associates Delivers Magic Total Services Desk" reference, after "Browser" insert -- Based --.

Column 14,
Line 20, after "comprising" delete ":".
Line 23, after "groups" delete ";".

Column 16,
Line 41, after "code" insert -- to --.

Signed and Sealed this

Twenty-first Day of February, 2006

JON W. DUDAS
*Director of the United States Patent and Trademark Office*